(12) United States Patent
Arafat

(10) Patent No.: US 11,289,215 B2
(45) Date of Patent: Mar. 29, 2022

(54) REACTOR SHUTDOWN SYSTEM WITH MELTING GATE MEMBER FOR SEGREGATING NEUTRON ABSORBING MATERIAL COMPARTMENT FROM CORE

(71) Applicant: WESTINGHOUSE ELECTRIC COMPANY, LLC, Cranberry Township, PA (US)

(72) Inventor: Yasir Arafat, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 125 days.

(21) Appl. No.: 16/711,922

(22) Filed: Dec. 12, 2019

(65) Prior Publication Data
US 2021/0183530 A1  Jun. 17, 2021

(51) Int. Cl.
| | | |
|---|---|---|
| *G21C 9/02* | (2006.01) | |
| *G21C 7/08* | (2006.01) | |
| *G21C 7/24* | (2006.01) | |
| *G21C 9/00* | (2006.01) | |
| *G21C 9/033* | (2006.01) | |

(Continued)

(52) U.S. Cl.
CPC .............. *G21C 9/022* (2013.01); *G21C 7/08* (2013.01); *G21C 7/24* (2013.01); *G21C 9/00* (2013.01); *G21C 9/033* (2013.01); *G21C 15/18* (2013.01); *G21D 3/04* (2013.01)

(58) Field of Classification Search
CPC ............ G21D 3/04; G21D 3/06; G21D 3/001; G21D 3/00; G21C 9/033; G21C 9/02; G21C 9/022; G21C 9/024; G21C 9/027; G21C 9/00; G21C 15/18; G21C 7/36; G21C 7/24; G21C 7/08
See application file for complete search history.

(56) References Cited

U.S. PATENT DOCUMENTS 2,773,823 A * 12/1956 Goett ................. G21C 7/08
376/219
2,919,236 A * 12/1959 Zinn ................. G21C 1/30
376/336

(Continued)

FOREIGN PATENT DOCUMENTS

JP  H0943379 A  2/1997

OTHER PUBLICATIONS

International Search Report and Written Opinion for International PCT Application No. PCT/US2020/064801, dated May 7, 2021.

*Primary Examiner* — Darlene M Ritchie
(74) *Attorney, Agent, or Firm* — K&L Gates LLP

(57) ABSTRACT

A system for use in shutting down a nuclear reactor includes a housing that defines a region therein sealed from an ambient environment and a gate member disposed within the region in a manner such that the gate member segregates the region into a first compartment and a second compartment isolated from the first compartment. The gate member is formed from a material having a predetermined melting point. The system further includes a neutron absorbing material disposed within the first compartment and a dispersion mechanism disposed within the region. The dispersion mechanism structured to encourage the neutron absorbing material from the first compartment into the second compartment.

14 Claims, 4 Drawing Sheets

(51) Int. Cl.
*G21C 15/18* (2006.01)
*G21D 3/04* (2006.01)

(56) References Cited

U.S. PATENT DOCUMENTS

| | | | | |
|---|---|---|---|---|
| 3,795,580 A * | 3/1974 | Schively | ............... | G21C 9/022 376/336 |
| 3,992,257 A * | 11/1976 | VAN Erp | ............... | G21C 9/027 376/336 |
| 4,076,587 A * | 2/1978 | Taulier | ................ | G21C 9/027 376/336 |
| 4,279,697 A * | 7/1981 | Overhoff | ................ | G21C 7/22 376/328 |
| 4,470,947 A * | 9/1984 | McCarthy | .............. | G21C 9/022 376/213 |
| 4,681,732 A * | 7/1987 | Mallener | ................ | G21C 9/022 376/337 |
| 5,319,688 A * | 6/1994 | Hora | ...................... | G21C 9/033 376/331 |
| 2009/0225926 A1 | 9/2009 | Carelli | | |
| 2015/0131769 A1* | 5/2015 | Larrion | .................. | B66B 5/027 376/282 |
| 2018/0075931 A1* | 3/2018 | Arafat | ..................... | G21C 5/12 |

* cited by examiner

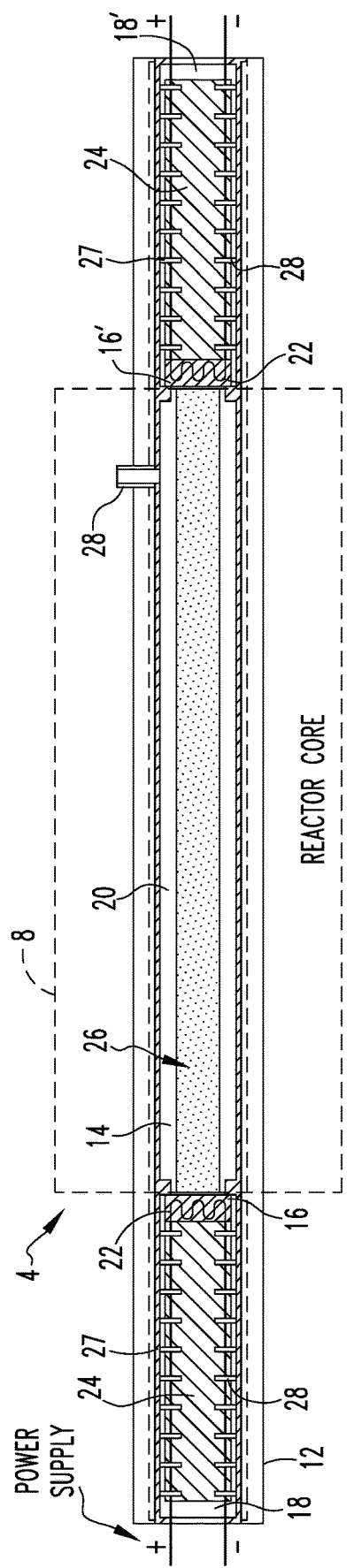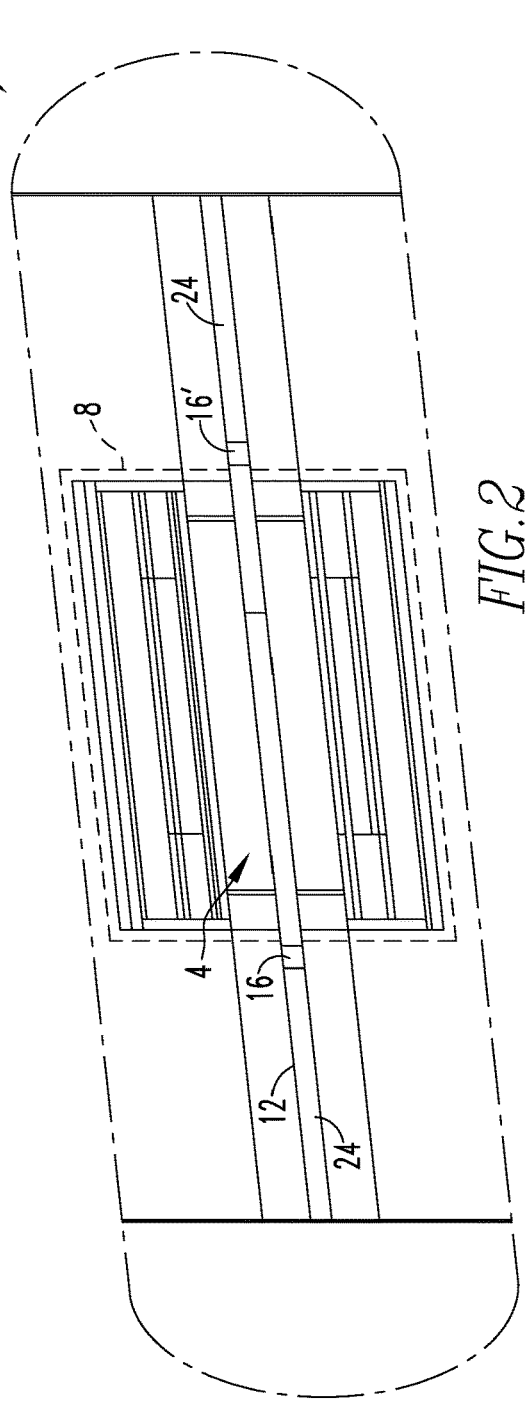

REACTOR SHUTDOWN SYSTEM WITH MELTING GATE MEMBER FOR SEGREGATING NEUTRON ABSORBING MATERIAL COMPARTMENT FROM CORE

BACKGROUND

1. Field

The present invention relates generally to nuclear reactors and, more particularly, relates to systems for use in shutting down a nuclear reactor. The present invention also relates to a nuclear reactor having such shut down systems and to a method of providing a system for use in shutting down a nuclear reactor.

2. Related Art

Currently, most water reactor technologies as well as most advanced reactors rely on diverse shutdown mechanisms to shut down the reactor. Examples are control rod drive mechanism (CRDM), neutron absorber spheres, boron injection into primary fluid, etc. Almost all of these systems are operated using a mechanical component, which is prone to failure, thus high reliability and qualification is typically needed. As such, additional redundancy and diversity has to be built into the design and safety case, which makes the plant complicated and drives cost up. Some of these systems have passive features which use gravity or other potential energy to enable passive features. However, these systems are large and not attractive for compact reactor designs, such as advanced micro reactors. In addition, such systems are not applicable to horizontal reactors. Reactors that have an inherent shutdown mechanism, such as TRIGA research reactors, are design specific and cannot be applied to other reactor designs.

Accordingly, there is room for improvement in shutdown systems for nuclear reactors.

SUMMARY

Embodiments of the present invention described herein provide a "solid-state" emergency core shutdown system for a nuclear reactor. The system is designed to actuate inherently, triggered by an adjustable design set point temperature. In addition, the system can be manually activated by an operator by the use of electrical power. The systems are applicable to any nuclear reactors, regardless of coolant type, neutron energy spectrum and size. This technology enables a nuclear reactor to be in IAEA passive safety category B for the shutdown system.

As one aspect of the present invention, a system for use in shutting down a nuclear reactor is provided. The system comprises: a housing defining a region therein sealed from an ambient environment; a gate member disposed within the region in a manner such that the gate member segregates the region into a first compartment and a second compartment isolated from the first compartment, the gate member comprising a material having a predetermined melting point; a neutron absorbing material disposed within the first compartment; and a dispersion mechanism disposed within the region, the dispersion mechanism structured to encourage the neutron absorbing material from the first compartment into the second compartment.

The predetermined melting point of the material may be around 800° C.

The gate member may comprise a number of heater coils embedded in the material that are structured to melt the material upon actuation by an electrical current.

The neutron absorbing material may comprise a phase change material.

The phase change material may comprise at least one of: an indium/cadmium alloy, lithium, or boron oxide.

The dispersion mechanism may comprise a porous matrix structure disposed in the second compartment.

The second compartment may be held under vacuum.

The porous matrix structure may be formed from one or more metals.

The porous matrix structure may be formed from one or more ceramic materials.

The neutron absorbing material may comprise a solid material.

The dispersion mechanism may comprise a number of springs disposed in the first compartment.

The system may further comprise: a second gate member disposed within the region in a manner such that the second gate member further segregates the region into a third compartment isolated from the second compartment by a second gate member comprising another material having a predetermined melting point; and a neutron absorbing material disposed within the first compartment.

As another aspect of the present invention, a nuclear reactor is provided. The nuclear reactor comprises: a core structured to house nuclear reactions; and a system for use in shutting down the nuclear reactor. The system comprises: a housing defining a region therein sealed from an ambient environment; a gate member disposed within the region in a manner such that the gate member segregates the region into a first compartment and a second compartment isolated from the first compartment, the gate member comprising a material having a predetermined melting point; a neutron absorbing material disposed within the first compartment; and a dispersion mechanism disposed within the region, the dispersion mechanism structured to encourage the neutron absorbing material from the first compartment into the second compartment, wherein the system is positioned relative to the core such that the first compartment is positioned outside of the core and the second compartment is disposed within the core.

As yet another aspect of the present invention, a method of providing a system for use in ceasing nuclear reactions within a core of a nuclear reactor is provided. The method comprises: positioning a system for use in shutting down the nuclear reactor, the system comprising: a housing defining a region therein sealed from an ambient environment; a gate member disposed within the region in a manner such that the gate member segregates the region into a first compartment and a second compartment isolated from the first compartment, the gate member comprising a material having a predetermined melting point; a neutron absorbing material disposed within the first compartment; and a dispersion mechanism disposed within the region, the dispersion mechanism structured to encourage the neutron absorbing material from the first compartment into the second compartment, wherein positioning the system comprises positioning the housing with respect to the core such that the first compartment is positioned outside of the core and the second compartment is disposed within the core.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which:

FIG. 1 is schematic elevational sectional view of a system for use in shutting down a nuclear reactor in accordance with one example embodiment of the present invention shown positioned relative to a core region of a nuclear reactor;

FIG. 2 is a perspective sectional view of a reactor arrangement having a system such as shown in FIG. 1 in accordance with one example embodiment of the present invention;

DETAILED DESCRIPTION

Figure 3:
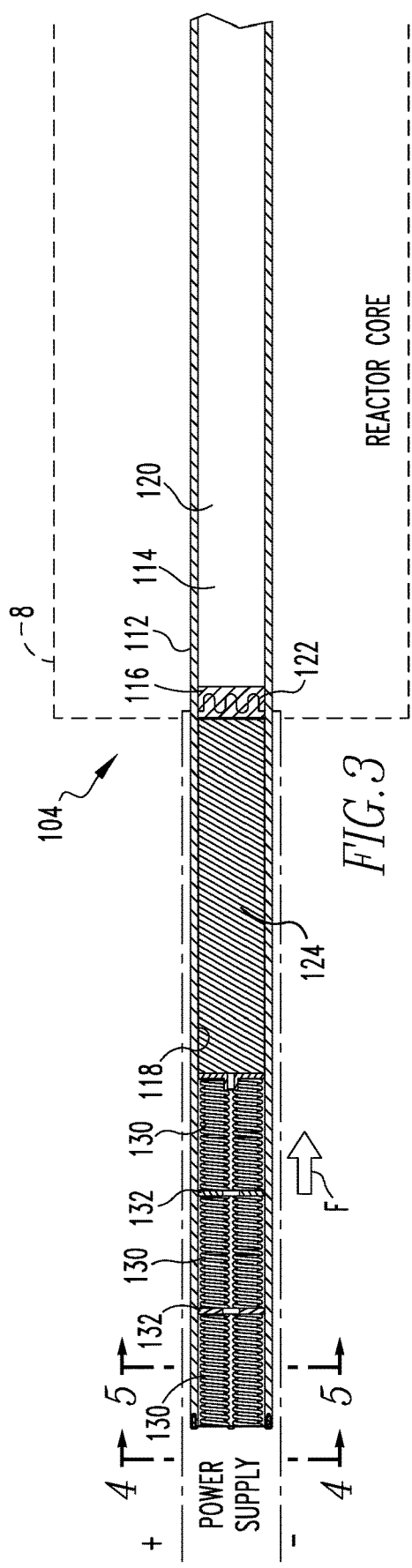
FIG. 3 is a schematic elevational sectional view of a system for use in shutting down a nuclear reactor in accordance with another example embodiment of the present invention.
Figure 5:
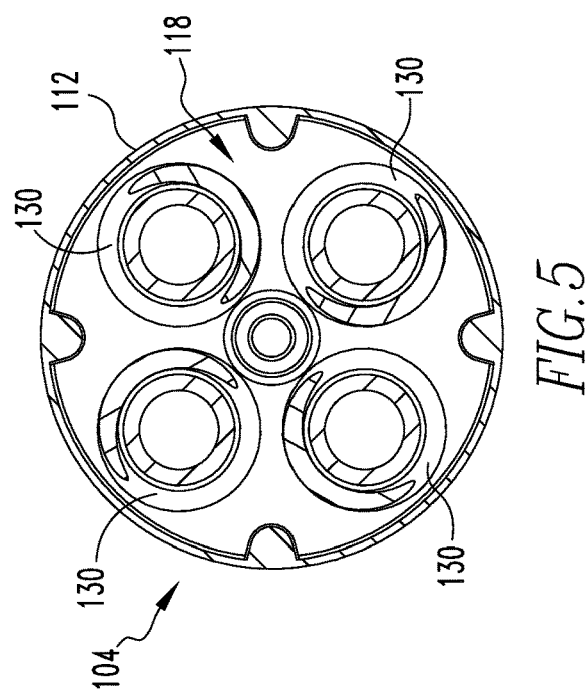
FIG. 5 is a elevational sectional view of the system of FIG. 3 taken along line 5-5 of FIG. 3.
Figure 4:
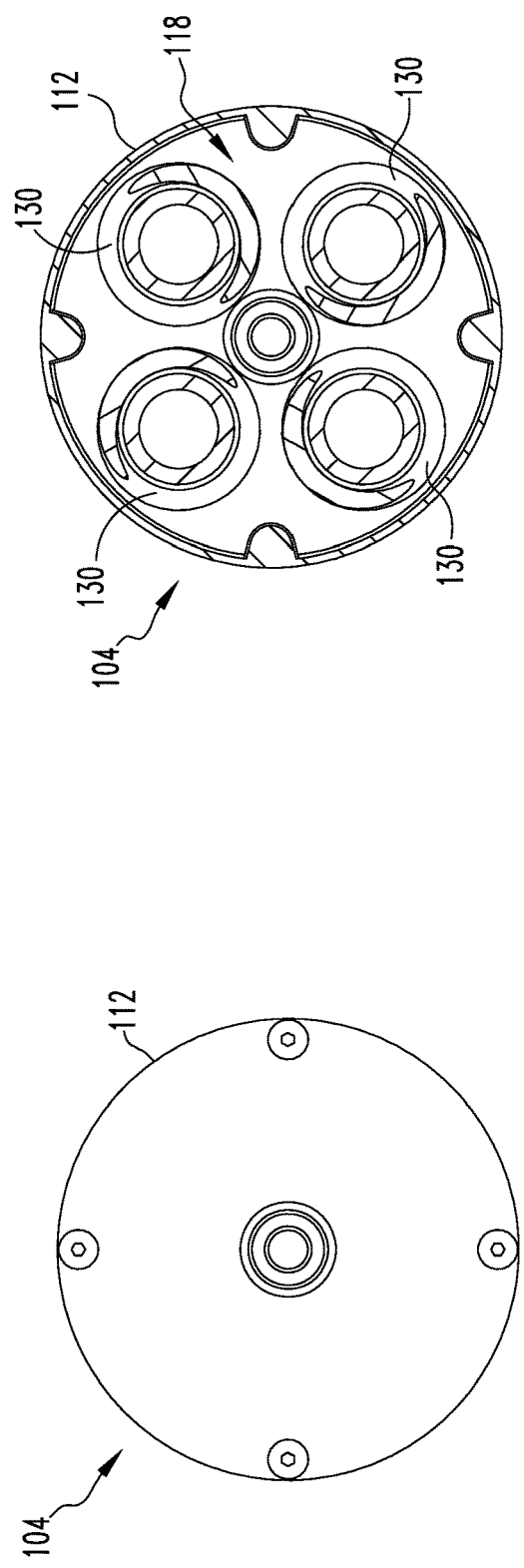
FIG. 4 is an elevational end view of the system of FIG. 3 taken along line 4-4 of FIG. 3.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

One example system 4 for use in shutting down a nuclear reactor in accordance with an embodiment of the present invention is shown schematically in FIGS. 1 and 2 positioned relative to a reactor core 8 (shown schematically in dashed lines) of a nuclear reactor 10. System 4 includes a housing 12 that defines a region 14 therein that is sealed from an ambient environment in which system 4 is provided. In the example embodiment of the present invention illustrated in FIG. 1, housing 12 is generally formed from a tubular member, however, it is to be appreciated that housing 12 may be of other shape(s) and/or relative sizings without varying from the scope of the present invention. System 4 further includes a first gate member 16 disposed within region 14 in a manner such that first gate member 16 segregates region 14 into a first end section 18 that is positioned outside of reactor core 8 when system 4 is installed in nuclear reactor 10, and a core section 20 that is positioned within reactor core 8 when system 4 is installed in nuclear reactor 10. In other words, core section 20 is isolated from first end section 18 by first gate member 16. First gate member 16 is formed from a material having a predetermined melting point that is above normal operating temperatures of nuclear reactor 10 but below a critical temperature of the reactor, where material design limits of the reactor are not exceeded. The significance of such arrangement will be appreciated from the further discussion below. Additionally, first gate member 16 may include a number of heater coils 22 embedded in the material thereof that are structured to melt the material upon actuation by an electrical current provided thereto by an outside power supply.

Optionally (as discussed further below), system 4 may further include a second gate member 16' disposed within region 14 in a manner such that second gate member 16' further segregates region 14 into a second end section 18' that is positioned opposite first end section 18 and outside of reactor core 8 when system 4 is installed in nuclear reactor 10. Second gate member 16' is formed from a material having a predetermined melting point that is above normal operating temperatures of nuclear reactor 10 but below a critical temperature of the reactor, where material design limits of the reactor are not exceeded. Additionally, second gate member 16' may include a number of heater coils 22 embedded in the material thereof that are structured to melt the material upon actuation by an electrical current provided thereto by an outside power supply.

Continuing to refer to FIG. 1, system 4 further includes a neutron absorbing material 24 disposed within first and second end sections 18 and 18' (i.e., outside of reactor core 8) and a dispersion mechanism 26 disposed within core section 20 of region 14 of housing 12 (i.e., within reactor core 8), that is structured to encourage the neutron absorbing material 24 from each of first and second end sections 18 and 18' into core section 20. In the example shown in FIG. 1, neutron absorbing material 24 is a phase change, neutron absorbing material (e.g., without limitation, indium/cadmium alloy, lithium or boron oxide) that can be transferred from first end section 18 to core section 20 to shut down a reactor in a manner such as described further below. In such example, dispersion mechanism 26 is a porous matrix which may be made out of either metals (e.g., without limitation, a stainless steel or niobium zirc, etc.) or ceramics (e.g., without limitation, graphite, beryllium oxide or alumina) which does not have a very low neutron absorption cross section. In order to ensure the voids in the porous matrix material are not otherwise occupied with gases which can hinder liquid adsorption, core section 20 may be held under vacuum, such as provided via a vacuum port 28 defined in housing 12 or via any other suitable arrangement.

Having thus described the general arrangement of system 4, operation thereof will now be described. Normal operating temperature of a reactor 10 such as shown in FIG. 2 is above 450° C. At such temperature, neutron absorbing material 24 will already be in a liquid phase. A reactor operator can actively activate system 4 by providing power to heater coils 22 to melt first gate member 16 (and/or second gate member 16'), which would be adsorbed into the porous matrix of dispersion mechanism 26, allowing access of neutron absorbing material 24 into the porous matrix by capillary forces. As neutron absorbing material 24 spreads evenly to core section 20 of system 4 (which is disposed within reactor core 8 of reactor 10), neutron absorption will occur and thus bring reactor 10 to shut down.

In an accident scenario where the primary coolant is cut off and reactor 10 is still in operation, the temperature of reactor core 8 will rise as will the temperature of core section 20 of system 4 which is positioned therein. As the temperature of core section 20 increases, heat from core section 20 will cause first gate member 16 (and/or second gate member 16') to melt, and be adsorbed into the porous matrix of dispersion mechanism 26, allowing access of neutron absorbing material 24 into the porous matrix by capillary forces. As neutron absorbing material 24 spreads evenly to core section 20 of system 4 (which is disposed within reactor core 8 of reactor 10), neutron absorption will occur and thus bring reactor 10 to shut down. Hence, system 4 will passively activate in the event of an emergency situation wherein temperatures of reactor 10 have exceeded a predetermined operating limit (i.e., the melting point of gate member(s) 16 and/or 16').

It is to be appreciated that the arrangement of a single one of end section 18 or 18' and the neutron absorbing material 24 contained therein is sufficient to bring reactor 10 to shut down, however, the use of two of such sections (where space is available) provides for redundancy and thus even greater reactor safety.

In example embodiments of the present invention, heat may be transferred to one or both of first and second end sections 18 and 18' within housing 12, where neutron absorbing material 24 resides, by the use of an integrated heat spreader (shown generally as 27), which can be either (i) a heat pipe or thermosiphon, which uses a phase changing fluid such as sodium to spread the heat (may be utilized for any size reactor) or (ii) a solid conductive tube or shell (applicable for small reactors). Heat pipe and thermosiphon arrangements such as commonly known may be employed. Typically, both arrangements transfer heat from one end to another. In the examples of FIGS. 1 and 2, heat is transferred from reactor core 8 into region 14 of housing 12 and out to first and second end sections 18 and 18' of system 4.

In the case of a heat pipe being employed, when core section 20 gets above a certain design temperature, the sodium melts and flashes to the first and second end sections 18 and 18' of system 4 where it is relatively colder. The heat then melts gates 16 and 16' and allows the neutron absorbing material 24 which is now in a liquid state to flow into the core section 20. As the heat is transferred to the neutron absorbing material, optionally via conductive fins 28, the sodium in the heat spreader condenses and is transported back to core section 20 passively by the capillary action of the heat spreader wick in heat pipe (applicable to horizontal reactors) or by gravity in a thermosiphon (applicable to vertical reactors). The heat spreader maintains isothermal temperature of the device throughout its length.

Referring now to FIGS. 3-7, another example of a system 104 for use in shutting down a nuclear reactor in accordance with another embodiment of the present invention will be described. The basic arrangement of system 104 (i.e., housing 112, region 114, first end section 118, second end section 118' (optional), core section 120, gate member(s) 116, 116', and heating element(s) 122 are generally the same as those of system 4 previously described and thus are not described in further detail herein. System 104 differs from system 4 in both the neutron absorbing material and the dispersion mechanism therefore that is employed. Instead of neutron absorbing material 24 that is distributed in a liquid phase by a dispersion mechanism 26 in the form of a porous matrix, system 104 utilizes a solid neutron absorbing material 124 (e.g., without limitation, boron carbide, boron carbide coated with gadolinium, pure gadolinium). In the example shown in FIGS. 3-7 neutron absorbing material 124 is in the form of a single solid cylindrical rod, however, it is to be appreciated that neutron absorbing material may be of other geometries, sizings or quantities (e.g., multiple elements) without varying from the scope of the present invention. Neutron absorbing material 124 is expelled from end section 118 by a dispersion mechanism 126 that is disposed within end section 118 of region 114 of housing 112. Unlike dispersion mechanism 26 of system 4 that utilizes a wicking effect to generally pull the liquid neutron absorbing material 24 into core section 20 of system 4, dispersion mechanism 126 of system 104 utilizes a physical force F to expel neutron absorbing material from first end section 118 into core section 120. Such physical force F may be provided via any suitable arrangement. In the example embodiment illustrated in FIGS. 3-5, physical force F is provided via a number of springs 130. More particularly, in the example embodiment illustrated in FIGS. 3-5, physical force F is provided in each end section 118 via a total of 12 springs 130 arranged in 4 spaced stacks, each stack having three springs 130 stacked end to end with alignment plates 132 positioned therebetween.

Figure 6:
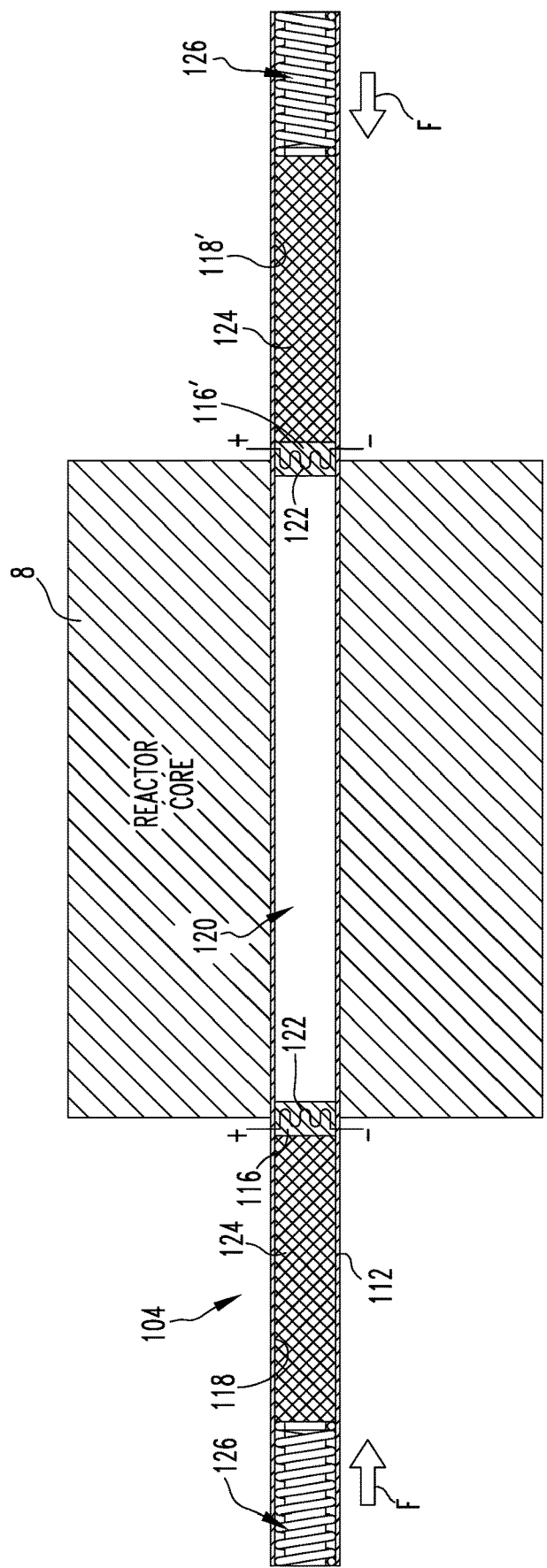
FIG. 6 is a schematic view of the system of FIG. 3 shown positioned with respect to a core of a nuclear reactor in accordance with one example embodiment of the present invention shown with a portion thereof disposed in a reactor operating mode.
Figure 7:
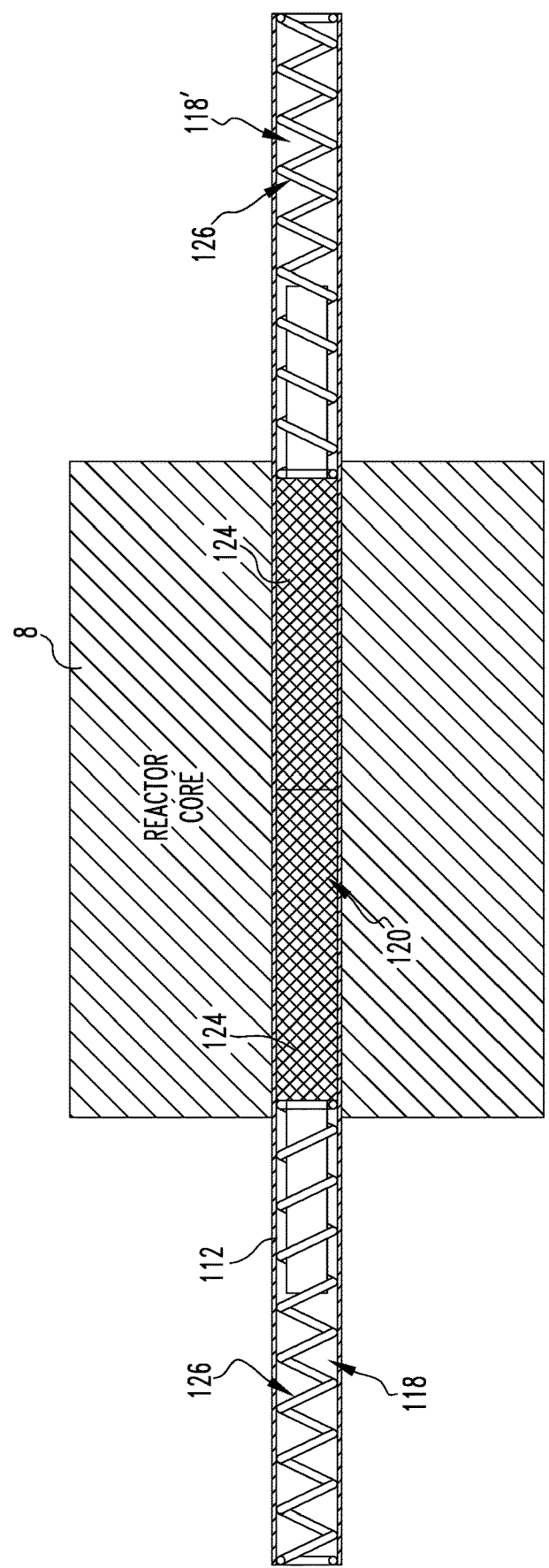
FIG. 7 is another schematic view of the system of FIG. 3 shown positioned with respect to a core of a nuclear reactor in accordance with one example embodiment of the present invention shown with a portion thereof disposed in a reactor shut-down mode.

The general operation of system 104 is similar to that of system 4 previously discussed. As shown in FIG. 6, during normal operating temperatures of a reactor, solid neutron absorbing material 124 will be contained in end section(s) 118 via gate member(s) 116. A reactor operator can actively activate system 104 by providing power to heater coils 122 of gate member(s) 116 to melt gate member(s) 116. As shown in FIG. 7, when gate member(s) 116 have melted to a sufficient extent, solid neutron absorbing material 124 is expelled into core section 120 (which is disposed within reactor core 8) by physical force F provided by dispersion mechanism 126. Once in core section 120, solid neutron absorbing material 124 will absorb neutrons present in reactor core 8, thus bringing reactor 10 to shut down.

In an accident scenario where the primary coolant is cut off and reactor 10 is still in operation, the reactor core temperature will rise as will the temperature of core section 120 of system 104 which is positioned therein. Such heat melts the gate(s) 116 and allows solid neutron absorbing material 124 to be ejected from end section(s) 118 into core section 120, thus bringing reactor 10 to shut down. Hence, system 104 provides for passive activation.

From the foregoing examples it is to be appreciated that embodiments of the present invention provide shut down systems that can be actively operated or that can be passively actuated. the passive systems described herein are generally simple and can be scaled for use in both micro-reactors as well as larger reactors (hundreds of megawatts), regardless of the coolant type, reactor design, orientation, etc. The material which forms the gates is chosen based on reactor design and set point temperature at which the reactor should shut down without operator intervention. For example, in a sodium heat pipe micro-reactor with a stainless steel 316 monolith core, reactor shutdown should commence at around 800° C. hence gates formed from bronze, brass or aluminum alloys are generally suitable.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A system for use in shutting down a nuclear reactor, the system comprising:
   a housing defining a region therein sealed from an ambient environment;
   a gate member disposed within the region in a manner such that the gate member segregates the region into a first compartment and a second compartment isolated from the first compartment, the gate member comprising a material having a predetermined melting point;
   a neutron absorbing material disposed within the first compartment; and
   a dispersion mechanism disposed within the region, the dispersion mechanism structured to actively encourage the neutron absorbing material from the first compartment into the second compartment,
   wherein the system is positioned relative to a core of the nuclear reactor such that the first compartment is positioned outside of the core and the second compartment is disposed within the core, and wherein the dispersion mechanism comprises a porous matrix structure disposed in the second compartment.

2. The system of claim 1, wherein the predetermined melting point of the material is around 8000 C.

3. The system of claim 1, wherein the gate member comprises a number of heater coils embedded in the material that are structured to melt the material upon actuation by an electrical current.

4. The system of claim 1, wherein the neutron absorbing material comprises a phase change material.

5. The system of claim 4, wherein the phase change material comprises at least one of an indium/cadmium alloy, lithium, or boron oxide.

6. A system for use in shutting down a nuclear reactor, the system comprising:
   a housing defining a region therein sealed from an ambient environment;
   a gate member disposed within the region in a manner such that the gate member segregates the region into a first compartment and a second compartment isolated from the first compartment, the gate member comprising a material having a predetermined melting point;
   a neutron absorbing material disposed within the first compartment; and
   a dispersion mechanism disposed within the region, the dispersion mechanism structured to encourage the neutron absorbing material from the first compartment into the second compartment,
   wherein the neutron absorbing material comprises a phase change material, and wherein the dispersion mechanism comprises a porous matrix structure disposed in the second compartment.

7. The system of claim 6, wherein the second compartment is held under vacuum.

8. The system of claim 6, wherein the porous matrix structure is formed from one or more metals.

9. The system of claim 6, wherein the porous matrix structure is formed from one or more ceramic materials.

10. The system of claim 1, wherein the neutron absorbing material comprises a solid material.

11. The system of claim 10, wherein the dispersion mechanism comprises a number of springs disposed in the first compartment.

12. The system of claim 1, further comprising:
   a second gate member disposed within the region in a manner such that the second gate member further segregates the region into a third compartment isolated from the second compartment by a second gate member comprising another material having a predetermined melting point; and
   a neutron absorbing material disposed within the first compartment.

13. A nuclear reactor comprising:
   a core structured to house nuclear reactions; and
   a system for use in shutting down the nuclear reactor, the system comprising:
      a housing defining a region therein sealed from an ambient environment;
      a gate member disposed within the region in a manner such that the gate member segregates the region into a first compartment and a second compartment isolated from the first compartment, the gate member comprising a material having a predetermined melting point;
      a neutron absorbing material disposed within the first compartment; and
      a dispersion mechanism disposed within the region, the dispersion mechanism structured to encourage the neutron absorbing material from the first compartment into the second compartment,
   wherein the system is positioned relative to the core such that the first compartment is positioned outside of the core and the second compartment is disposed within the core, and wherein the dispersion mechanism comprises a porous matrix structure disposed in the second compartment.

14. A method of providing a system for use in ceasing nuclear reactions within a core of a nuclear reactor, the method comprising positioning a system for use in shutting down the nuclear reactor, the system comprising: a housing defining a region therein sealed from an ambient environment; a gate member disposed within the region in a manner such that the gate member segregates the region into a first compartment and a second compartment isolated from the first compartment, the gate member comprising a material having a predetermined melting point; a neutron absorbing material disposed within the first compartment; and a dispersion mechanism disposed within the region, the dispersion mechanism structured to encourage the neutron absorbing material from the first compartment into the second compartment, wherein positioning the system comprises positioning the housing with respect to the core such that the first compartment is positioned outside of the core and the second compartment is disposed within the core, and wherein the dispersion mechanism comprises a porous matrix structure disposed in the second compartment.

* * * * *